United States Patent
Veeraraghavan et al.

(10) Patent No.: US 8,223,259 B2
(45) Date of Patent: Jul. 17, 2012

(54) INCREASING TEMPORAL RESOLUTION OF SIGNALS

(75) Inventors: Ashok N. Veeraraghavan, Cambridge, MA (US); Amit K. Agrawal, Somerville, MA (US); Ramesh N. Raskar, Cambridge, MA (US); Dikpal N. Reddy, Greenbelt, MD (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 394 days.

(21) Appl. No.: 12/571,417

(22) Filed: Sep. 30, 2009

(65) Prior Publication Data

US 2011/0075020 A1 Mar. 31, 2011

(51) Int. Cl.
*H04N 5/238* (2006.01)
*H04N 5/228* (2006.01)
*G06K 9/36* (2006.01)

(52) U.S. Cl. ............... 348/367; 348/208.12; 348/222.1; 382/280

(58) Field of Classification Search .................. 348/362, 348/363, 367, 370, 371, 296, 297, 208.4, 348/208.12, 208.13, 222.1, 403.1, 412.1, 348/415.1; 382/280, 254, 248
See application file for complete search history.

(56) References Cited

U.S. PATENT DOCUMENTS

| | | | |
|---|---|---|---|
| 6,631,240 B1 * | 10/2003 | Salesin et al. | 386/290 |
| 7,428,019 B2 * | 9/2008 | Irani et al. | 348/208.13 |
| 7,580,620 B2 | 8/2009 | Raskar | |
| 2007/0258707 A1 * | 11/2007 | Raskar | 396/52 |
| 2008/0062287 A1 * | 3/2008 | Agrawal et al. | 348/241 |
| 2009/0244300 A1 * | 10/2009 | Levin et al. | 348/208.5 |

* cited by examiner

*Primary Examiner* — Nhan T Tran
(74) *Attorney, Agent, or Firm* — Dirk Brinkman; Gene Vinokur

(57) ABSTRACT

Embodiments of invention disclose a system and a method for increasing a temporal resolution of a substantially periodic signal. The method acquires a signal as an input sequence of frames having a first temporal resolution, wherein the signal is a substantially periodic signal, wherein the frames in the input sequence of frames are encoded according to an encoded pattern; and transforms the input sequence of frames into an output sequence of frames having a second temporal resolution, such that the second temporal resolution is greater than the first temporal resolution, wherein the transforming is based on a sparsity of the signal in Fourier domain.

19 Claims, 7 Drawing Sheets

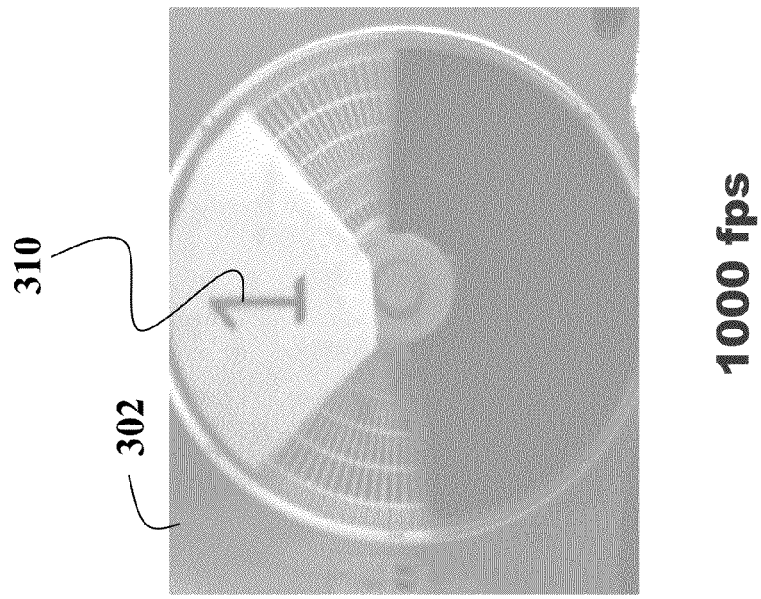
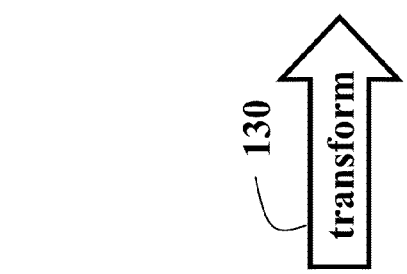
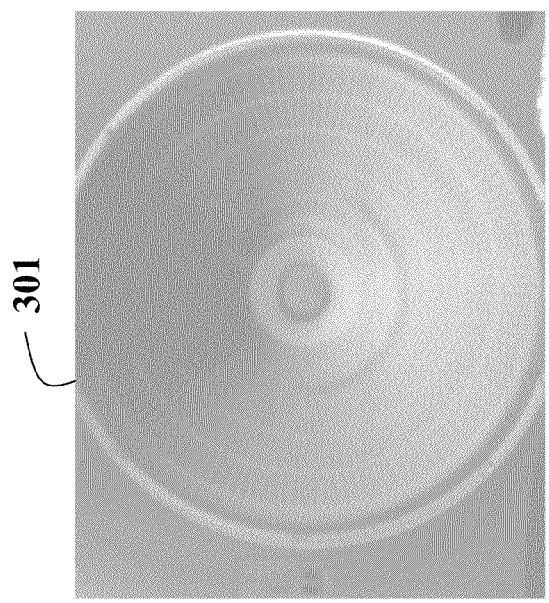
Fig. 3

400

$$y = C \times B \times s$$
$$[M\times 1] = [M\times N][N\times N][N\times 1]$$

INCREASING TEMPORAL RESOLUTION OF SIGNALS

FIELD OF THE INVENTION

This invention relates generally to processing signals, and more particularly to increasing a temporal resolution of periodic and quasi-periodic signals.

BACKGROUND OF THE INVENTION

Periodic signals are common in nature and machines. Quasi-periodic signals are signals that are significantly repetitive without being exactly periodic. Hereinafter, substantially periodic signals include periodic and quasi-periodic signals. A number of biological activities such as heart-beats and respiration, industrial automation processes, and consumer products such as hand-mixers and cooling fans generate substantially periodic signals.

High Speed Imaging Hardware

One of the constraints for recording a high speed video signal is a short exposure time to reduce motion blur. This requires increased illumination or the use of high gain imagers. However, in many applications bright light cannot be used. Furthermore, high speed cameras are expensive.

Strobing

Conventional stroboscopes synchronize a periodic short burst of illumination to the periodic motion in the scenes so that the motion appears stationary, or almost stationary. If the synchronization is exact, the motion is stationary. When the synchronization is slightly slower or faster than the motion, the motion appears to go slowly backwards or slowly forwards. To be able to achieve these effects, the period of the motion must be known in advance. Also, because the illumination is a periodic short burst, the total illumination time is very small requiring extremely bright sources. Therefore, most stroboscopes use very bright flashes to compensate for the reduced illumination.

Processing

Many computer vision applications are dealing with substantially periodic motion. For example, a period trace provides a description of temporal variations in periodic motion, and can be used to detect motion trends and irregularities.

Structured-light can be used to obtain dense depth and color samples for moving and deformable surfaces undergoing repetitive motions. Another alternative method to obtain high temporal and spatial resolution of a signal is via a hybrid imaging device, which includes a high spatial resolution digital camera in conjunction with a high frame-rate, but low resolution video camera. Also, coded exposures can be used to reduce blurs in images caused by linear motion.

It is desired to increase temporal resolution of substantially periodic signals acquired by cameras without the use of bright illumination or the use of expensive high-gain sensors.

SUMMARY OF THE INVENTION

Embodiments of invention disclose a system and a method for increasing a temporal resolution of a substantially periodic signal.

One embodiment discloses a method which acquires a signal as an input sequence of frames having a first temporal resolution, wherein the signal is a substantially periodic signal, wherein the frames in the input sequence of frames are encoded according to an encoded pattern; and transforms the input sequence of frames into an output sequence of frames having a second temporal resolution, such that the second temporal resolution is greater than the first temporal resolution, wherein the transforming is based on a sparsity of the signal in the Fourier domain.

Another embodiment disclose a system for increasing a temporal resolution of a substantially periodic signal including a sensor configured to acquire a signal as an input sequence of frames having a first temporal resolution, wherein the signal is a substantially periodic signal; a shutter configured to encode the frames in the input sequence of frames according to an encoded pattern; and a transformation module configured to transform the input sequence of frames into an output sequence of frames having a second temporal resolution, such that the second temporal resolution is greater than the first temporal resolution, wherein the transforming is based on a sparsity of the signal in the Fourier domain.

BRIEF DESCRIPTION OF THE DRAWINGS

FIG. 3 is an example results from a system using an embodiment of the invention;

FIG. 6 is a schematic of a combination of an observation and signal models according to an embodiment of the invention.

DETAILED DESCRIPTION OF THE PREFERRED EMBODIMENT

Figure 1:
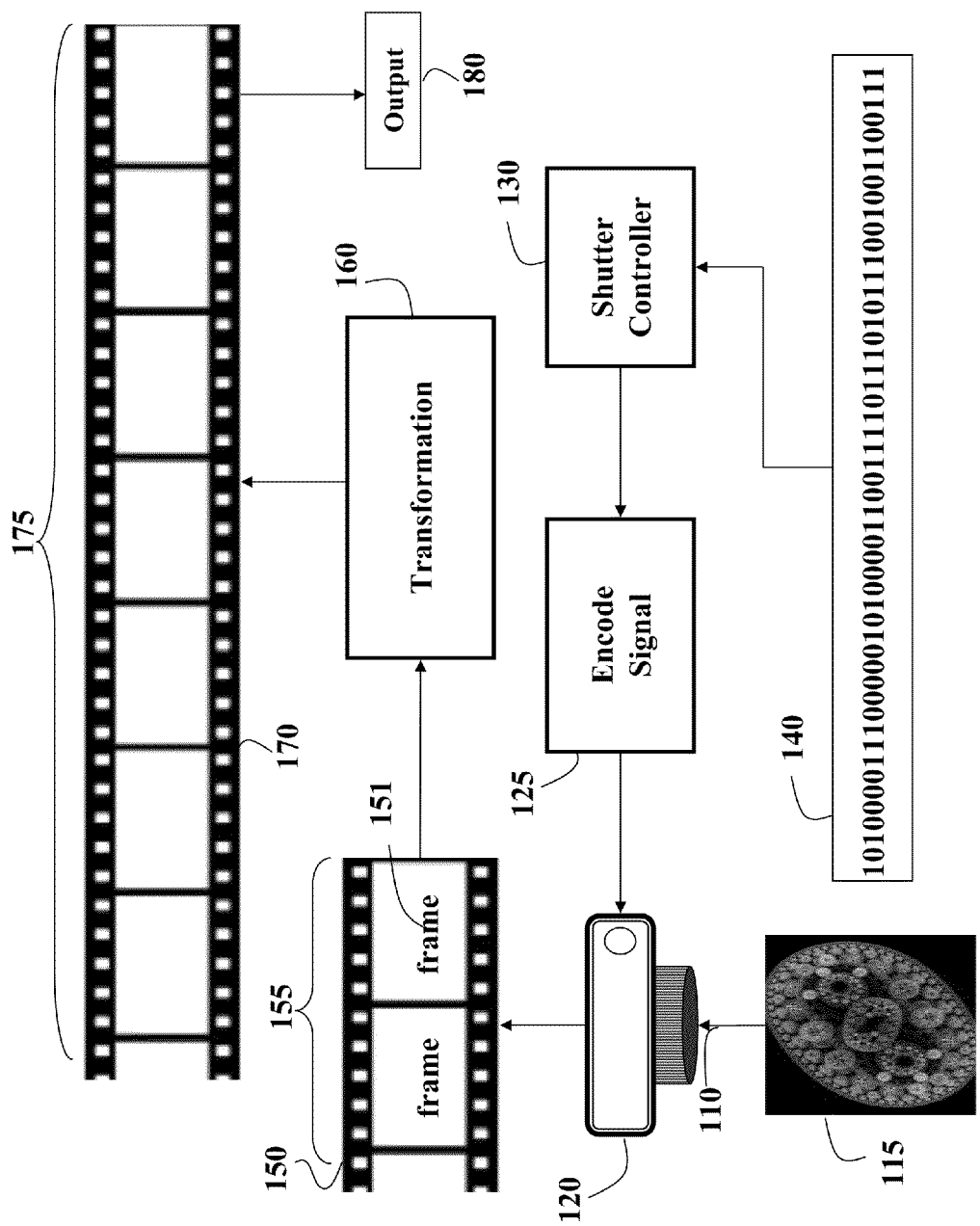
FIG. 1 is a block diagram of a method for increasing a temporal resolution of periodic signals according to embodiments of invention.

FIG. 1 shows a method for increasing a temporal resolution of substantially periodic signals according to embodiments of an invention. Hereinafter, substantially periodic signals include periodic or quasi-periodic signals. The signals can be visual, acoustic, electric or combinations thereof.

The signal 110 is acquired of a scene 115 by a sensor 120, e.g., a camera, as an input sequence 150 of frames 151 having a first temporal resolution 155 (frames per second). The signal 100 is substantially periodic and corresponds to substantially periodic events 115, e.g., spinning toothbrush.

In some embodiments, an encoding pattern 140 is used by a shutter controller 130 to encode 125 the signal 110. For example, the shutter controller opens and closes the camera shutter during signal integration for a single image or frame, see U.S. Pat. No. 7,580,620, incorporated herein by reference. The encoding pattern 140 is temporally varying. In some embodiments, the encoding pattern is determined such that frames in the input sequence are encoded differently. As defined herein, differently encoded frames include at least a first frame and a second frame, such that the first frame is encoded according to a first part of the encoding pattern, the second frame is encoded according to a second part of the encoding pattern, and the first part of the encoding pattern differs from the second part of the encoding pattern.

The input sequence 150 is transformed 160 to produce an output sequence of frames 170 having a second temporal resolution 175 such that the second temporal resolution is greater than the first temporal resolution. The output sequence of frames can be output, e.g., to a display device, storage, or a transmitter (not shown).

Figure 2A:
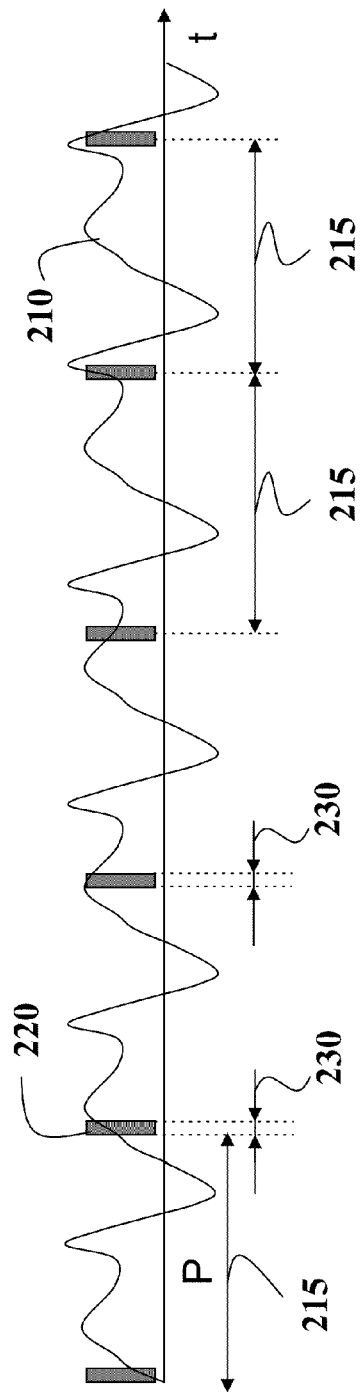
FIGS. 2A-B are timing diagrams of conventional and coded strobing.
Figure 2B:
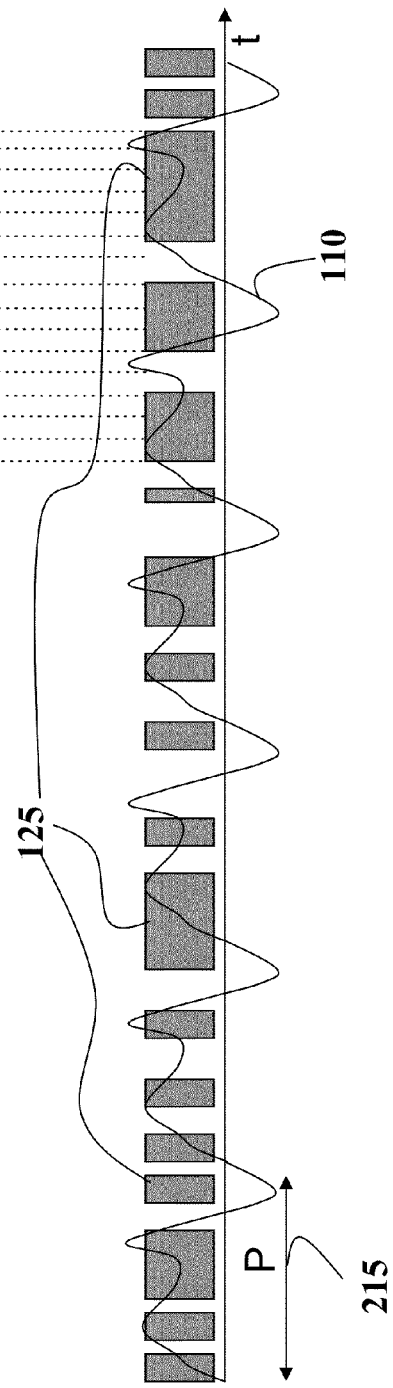

FIGS. 2A-2B respectively shows a conventional strobing, and coded strobing according embodiments of the invention. In conventional strobing, the signal 210 is sampled 220 during sampling times 230 synchronized to a predetermined strobing period 215. The sample of the signal acquired during the sampling time 230 generates one frame 151. If the period and sampling times are the same, then the signal appears stationary. If the sampling time is slightly different then the period, then the signal appears to retard or advance slowly.

In our embodiments, the signal is acquired while the shutter is turned on and off multiple times, according to the encoding pattern 140 while integrating light for each frame. In another embodiment, an external shutter is placed in front of a camera. The shutter is alternately made opaque and transparent according to the encoding pattern during the signal integration time. In yet another embodiment, integration of the light at the sensor 120 is turned on/off according to the encoding pattern during the signal integration time.

For example, while acquiring a frame 240 according to the pattern 140, the signal is integrated 242 only when the pattern is "1," and not integrated when the binary pattern equals "0" 241. In a non-limiting example shown on FIG. 2B, the encoding pattern for the frame 240 is "111001110011111." As a result, the integration for a single frame is temporally modulated or encoded.

In some embodiments, the encoding pattern is selected such that modulation varies over the frames of the sequence 150 according to identically distributed (i.i.d.) Bernoulli numbers.

The input sequence of frames is transformed by a transformation module 160 to the output sequence using techniques derived from sparse reconstruction and compressive sensing methods.

FIG. 3 shows a first temporal resolution 301 at 20 fps, and the second temporal resolution 302 at 1000 fps. The signal 110 is generated by a fan with the number "1" 310 on one of the rotating blades. The number is only visible in the higher resolution sequence.

In embodiments processing non-visual signals, e.g., electrical or audio signals, n the shutter 130 and the camera 120 are replaced by appropriate sensors configure to acquire the non-visual signals. For example for electric or electronic signals, the camera 120 is replaced by a conventional voltmeter or ammeter while the shutter 130 is replaced by a circuit that performs the encoding of the incoming electrical signal. Similarly in the case of audio signals, the camera 120 is replaced by a microphone and the shutter 130 is replaced by an audio modulation device.

Observation Model

Figure 4:
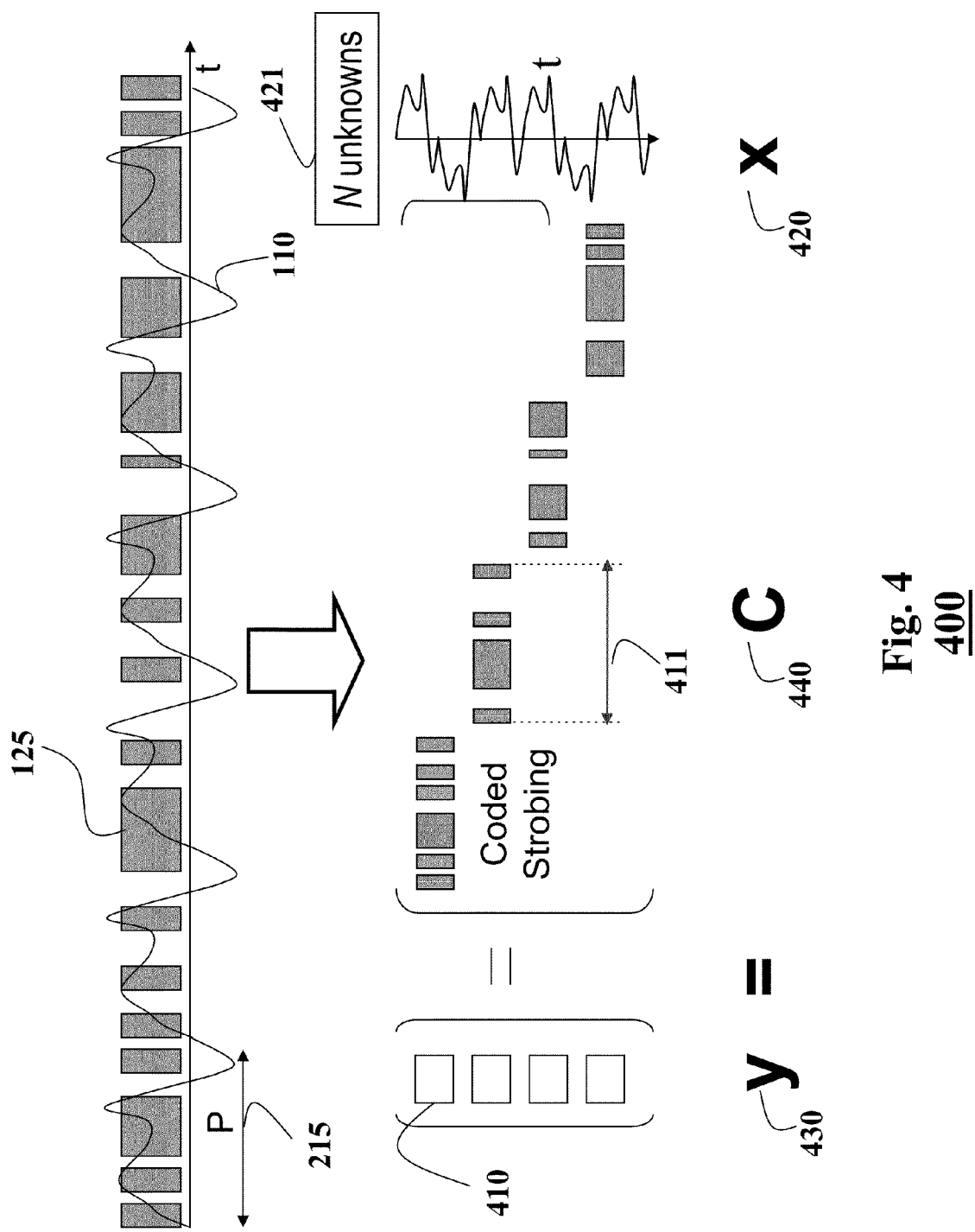
FIG. 4 is a schematic of an observation model according to an embodiment of the invention.

FIG. 4 shows an observation model 400. The substantially periodic signal x(t) 110 with a fundamental frequency $f_p$ over time t has a period $P=1/f_p$ 215 and a maximum frequency $f_{Max}$. Because the signal is substantially periodic, the signal can be express as, $$x(t) = x_{DC} + \sum_{j=1}^{j=Q} a_j \cos(2\pi jf_p t) + b_j \sin(2\pi jf_p t). \quad (1)$$

A Fourier transform of the signal x(t) contains energy only in the frequencies corresponding to $jf_p$, where $j \in \{-Q, -(Q-1), \ldots 0, 1, \ldots, Q\}$, Q is a real number and $x_{DC}$ is an average brightness of that pixel. Thus, the substantially periodic signal has a maximum of K=2Q+1 non-zero Fourier coefficients and a sparse representation in the Fourier domain.

The signal 110 is frequency band-limited to $[f_{Max}, f_{Max}]$. To accurately represent the signal as the sequence having a second temporal resolution 175, samples of the signal are acquired $\delta t = 1/(2f_{Max})$ time apart, where $\delta t$ corresponds to a sampling period of the second temporal resolution. If the acquisition time is N$\delta t$, then N samples of the signal are acquired. The N unknown samples 421 are represented as a N dimensional vector x 420. In a conventional camera, radiance is integrated at a pixel during each exposure time, and recorded as the intensity of the pixel. The embodiments of the invention encode 125 the modulation of the incoming radiance while integrating according the encoding pattern 140. Thus, the intensity values at a pixel y 330, is $$y = Cx + \eta \quad (2)$$

where a M×N encoded matrix C 340 performs both the modulation and integration for the duration of the frames, wherein M is a number of frames in the input sequence of frames, N is a number of frames in the output sequence of frames, M<<N, and $\eta$ is noise.

If the sensor 120 acquires a frame every $T_S$ seconds 411, then the total number of frames in the input sequence is M=N$\delta t/T_S$, and the intensity values at the pixel y is a M×1 vector for the sequence. If M<<N and $f_s=1/T_s$ is the first temporal resolution, an upsampling factor according the embodiments is $$UpsamplingFactor = U = \frac{N}{M} = \frac{2f_{Max}}{f_s}. \quad (3)$$

For example, in one embodiment, $f_{Max}=1000$ Hz, and $f_S=25$ fps. Therefore, the upsampling factor is 80, i.e., the frame-rate of the camera 120 is eighty times slower than an equivalent high speed video camera. Effective modulation can be achieved with codes that have a 50% transmission, i.e., the shutter is open half the time. However, various embodiments of the invention use different transmission ratios.

Signal Model

Figure 5:
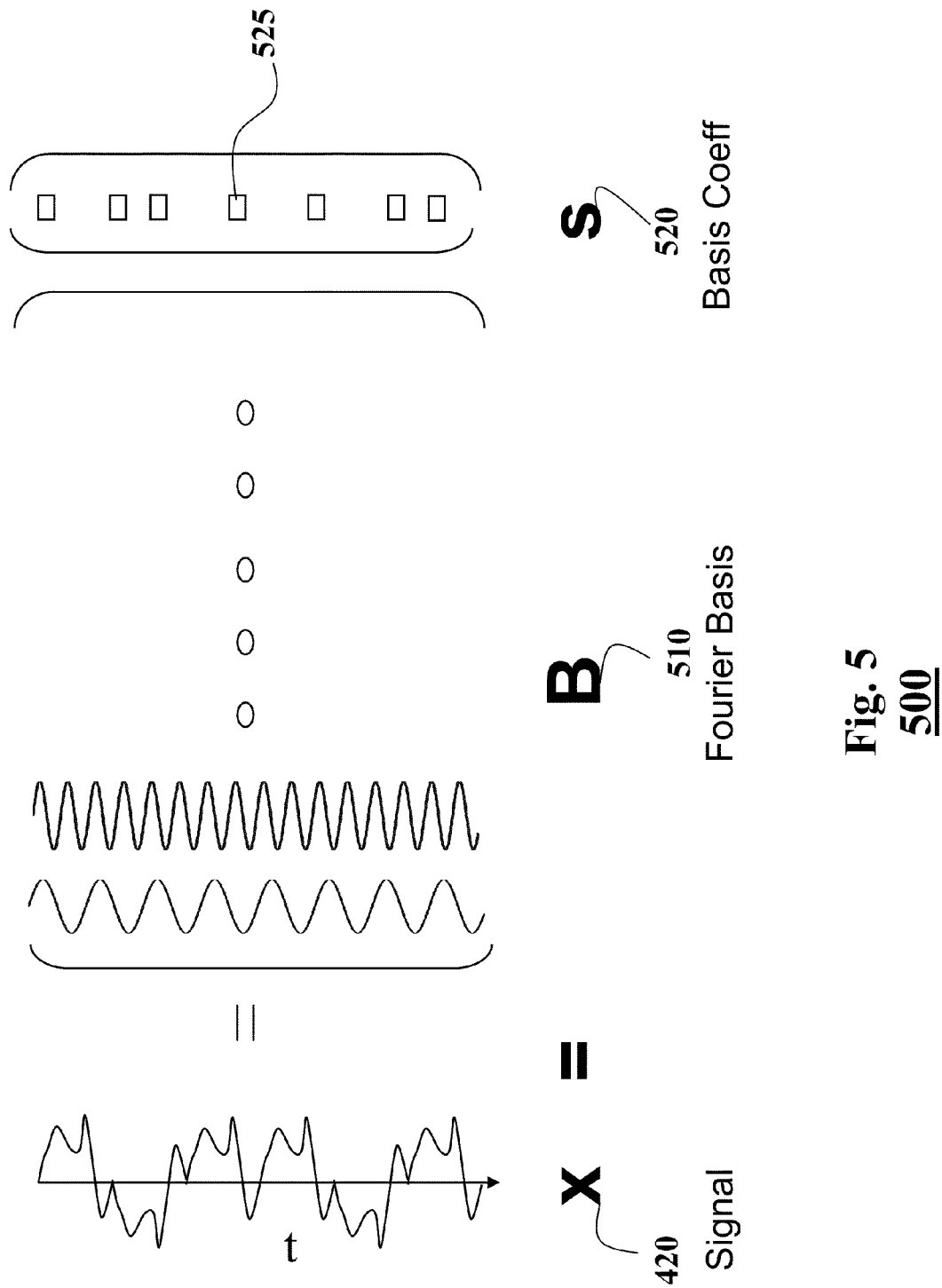
FIG. 5 is a schematic of a signal model according to an embodiment of the invention.

FIG. 5 show a signal model 500. The signal x is $$x = Bs, \quad (4)$$

where, B is an inverse Fourier transformation matrix 510 having columns containing Fourier basis elements, and a vector s is a Fourier coefficient vector 520. Because the signal x(t) is substantially periodic, the Fourier coefficient vector s is sparse, i.e., has a small number of non-zero elements 525. Combining the signal and the observation model, the acquired samples are related to the basis coefficients by $$y = Cx + \eta = CBs + \eta = As + \eta, \quad (5)$$

where A is a mixing matrix of the transformation 160.

Transformation

Because the acquired intensity values are modulated, the transformation 160 of the input sequence to the output sequence is performed by solving the linear system of Equation (5).

Figure 6:
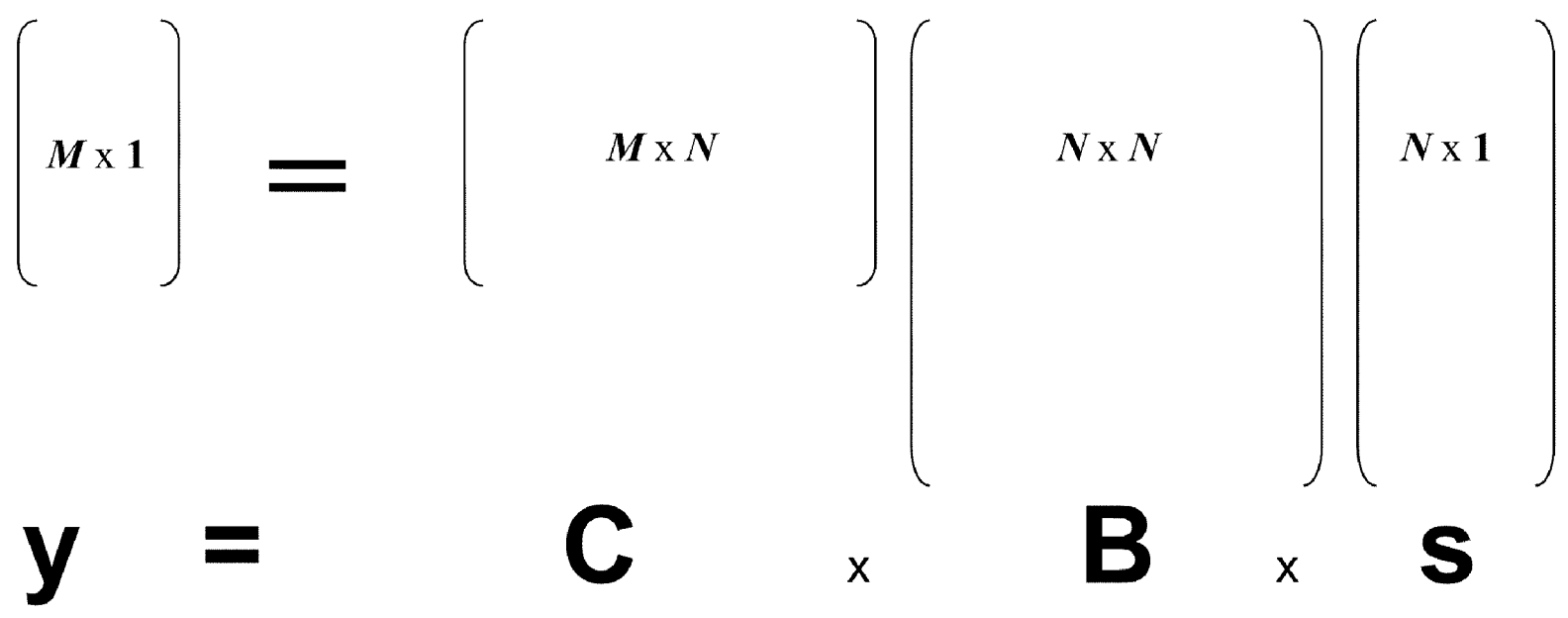

FIG. 6 shows a relationship between acquired samples and the Fourier coefficient vector s. As described above, the vector y has a dimension M×1, wherein each element of the vector y is a value of the signal acquired in a corresponding frame. For example, if the signal 110 is a video signal, values of the vector y represents intensities of pixels. Values of the vector y are known after the input sequence of frames is acquired.

The encoded matrix C has a size M×N. Values of the encoded matrix are known and depends on the encoding pattern 140, as shown on FIG. 4. The Fourier transformation matrix has a size N×N, and the values of the Fourier transformation matrix are known. Thus, the transformation requires reconstruction of coefficients s from modulated intensities y of the signal to determine the unknown vector x. However, the number of unknowns exceeds the number of known variables by the upsampling factor U, e.g., 80 in one embodiment. Hence, the system of Equation (5) is severely under-determined.

Accordingly, embodiments of the invention use additional knowledge about the periodicity of the signal such as sparsity of the Fourier coefficients s, in order to solve Equation (5).

Sparsity Enforcing Transformation

Due to periodicity of the signal 110, the Fourier coefficient vector s includes only K non-zero elements, i.e., the signal is K-sparse. Moreover, each non-zero Fourier coefficient is harmonic of the fundamental frequency $f_p$ of the signal, i.e., the vector s has non-zero values in elements with indices corresponding to $jf_p$, where j is a positive integer number. Accordingly, one embodiment of the invention determines the fundamental frequency $f_p$ and reverses under-determination of Equation (5).

Figure 7:
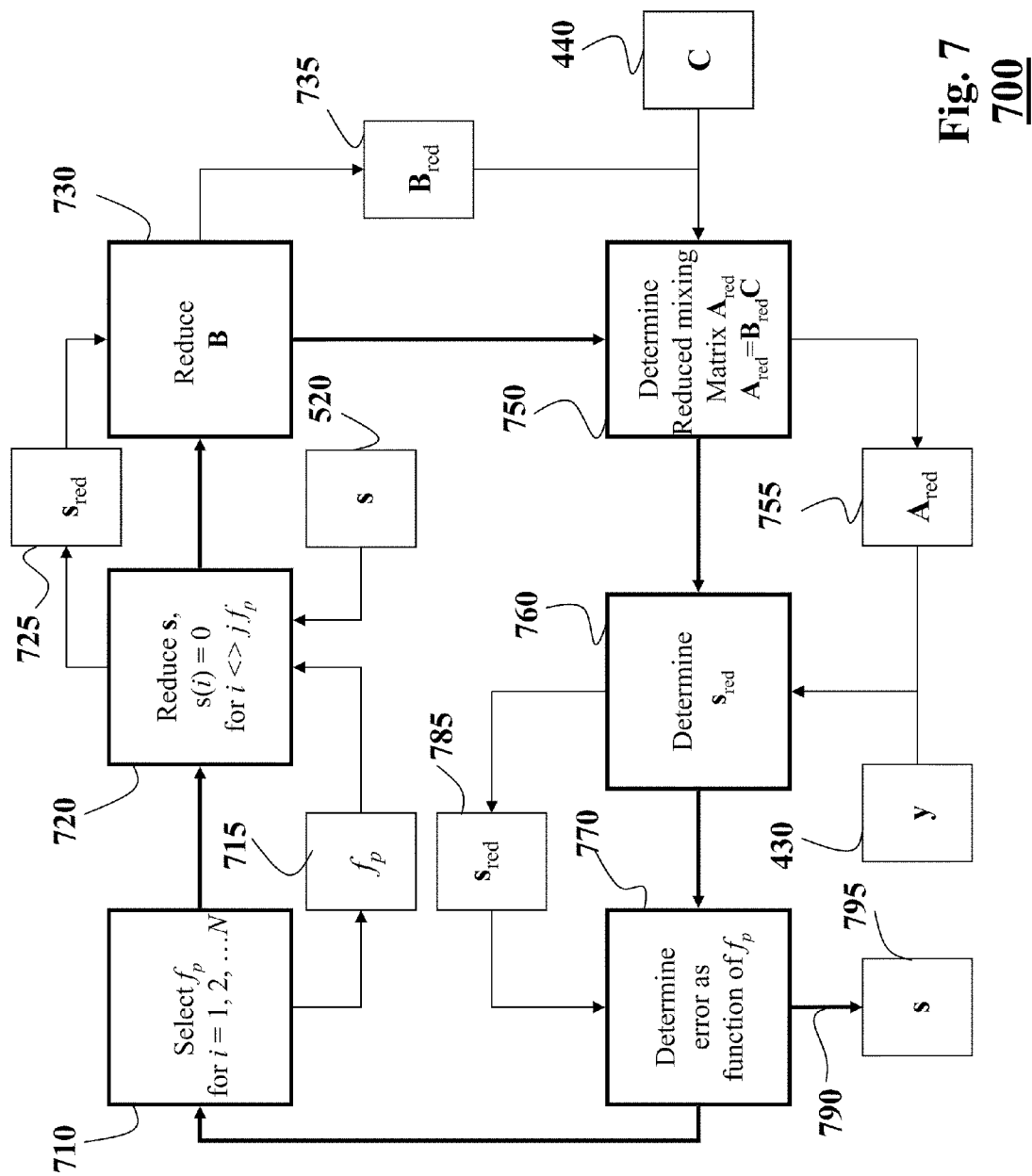
FIG. 7 is a block diagram of a method for determining a fundamental period of a signal according to embodiments of the invention.

FIG. 7 shows a block diagram of a method 700 for determining the fundamental frequency of the signal 110. The method 700 is performed for different possible values of fundamental frequencies 710. For each fundamental frequency 715, the Fourier coefficient vector s 785 is determined and compared with the acquired vector y 775 to determined 790 an error as a function of the fundamental frequency. The Fourier coefficient vector 795 which results in minimal error is selected.

For each selected value of the fundamental frequency of a set of possible values of the fundamental frequencies 710, reduced vector of Fourier coefficient $s_{red}$ 725 is determined 720. The reducing step 720 removes elements from the Fourier coefficients vector s having indices not equal to $jf_p$. Thus, the vector $s_{red}$ has K elements, where K<<N.

Accordingly, The size of the matrix B 510 is also reduce producing $B_{red}$ 735 having a size M×K by removing columns from the matrix B with indices corresponding to indices of elements removed from the vector s. Similarly, the effective mixing matrix A=BC is also reduced in size producing 750 a reduced mixing matrix $A_{red}$ 755 having size M×K, i.e., $A_{red}=B_{red}C$.

Thus, Equation (5) can be rewritten as $$y = A_{red} s_{red}. \quad (6)$$

If K≦M, Equation (6) can determine 760 the reduced Fourier coefficient vector 785 corresponding to the fundamental frequencies 715. The determining step 760 can use, e.g., linear inversion techniques according to (7)

$$\hat{s}_{red} = A^{\dagger}_{red} y, \quad (7)$$

where $A^{\dagger}_{red}$ is the pseudo inverse of the reduced mixing matrix $A_{red}$.

For each reduced Fourier coefficient vector 785, an error 790 as a function of fundamental frequencies is determined 770 to produce a set of errors according to, for example:

$$Err(f_p) = \|y - A_{red}\hat{s}_{red}\|_2. \quad (9)$$

The Fourier coefficient vector 795 minimizing the error is selected. Knowing the vector s, unknown values of the signal having second temporal resolution are determined according Equation (4).

Anomalies in the Substantially Periodic Signal

In many applications, such as medical imaging, a vibrating or oscillating part of the body, e.g., the vocal fold, can "miss a beat" at regular intervals due to some abnormality. Although the visual signal is substantially periodic, an entire can be corrupted causing anomalies in the signal. An anomalous signal $x_a(t)$ can be written as $x_a(t)=x(t)+a(t)$, where the anomaly a(t) of the signal is mostly zero except at regular periods. In many applications, the anomalous part a(t) is an undesirable corruption and we would like to recover the substantially periodic signal x(t) exactly.

Because the anomalies corrupt an entire period and occur relatively infrequently, one embodiment detects the anomalous periods directly from the coded strobing observation y. Because anomalies are sparse in the time domain and the substantially periodic signal is sparse in Fourier domain, the anomalous signal is sparse in the joint basis $B_a=[BI]$, where $B_a$ is a N×2N matrix.

An anomalous signal $x_a=B_a s_a$ with coefficient $s_a=[s^T a^T]^T$ represents both the frequency components s of the substantially periodic signal, and the anomalous periods in a(t). We recover coefficients â corresponding to the anomalous instants in time in which â are non-zero only in locations corresponding to corrupted coded strobing frames. These frames are then discarded.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for increasing a temporal resolution of a substantially periodic signal, comprising a processor for performing steps of the method, comprising the steps of:
   acquiring a signal as an input sequence of video frames having a first temporal resolution, wherein the signal is a substantially periodic signal, wherein each frame is encoded according to an encoded pattern; and
   transforming the input sequence of video frames into an output sequence of video frames having a second temporal resolution, such that the second temporal resolution is greater than the first temporal resolution, and wherein the transforming is based on a sparsity of the signal in a Fourier domain.

2. The method of claim 1, further comprising:
   encoding the signal by opening and closing a shutter of a camera according to the encoded pattern during a signal integration time of each frame of the input sequence of video frames.

3. The method of claim 1, further comprising: encoding the signal by alternately making a shutter opaque and transparent according to the encoded pattern during a signal integration time of each frame of the input sequence of video frames.

4. The method of claim 1, further comprising: encoding the signal by turning integration of light by a sensor on and off according to the encoded pattern during a signal integration time of each frame of the input sequence of video frames.

5. The method of claim 1, wherein the encoding pattern is temporally varying.

6. The method of claim 1, wherein the encoding pattern is a binary pattern.

7. The method of claim 1, wherein the encoding pattern is according to a probability distribution function.

8. The method of claim 1, wherein the input sequence of video frames includes a first frame and a second frame, such that at the first frame is encoded according to a first part of the encoding pattern, file second frame is encoded according to a second part of the encoding pattern, and the first pan of the encoding pattern differs from the second part of the encoding pattern.

9. The method of claim 1, further comprising: encoding the signal by alternately switching a light source on and off according to the encoded pattern during a signal integration time of each frame of the input sequence of video frames.

10. The method of claim 1, wherein the transforming further comprising:
representing the signal according to an observation model;
representing the signal according to a signal model;
combining the observation model and the signal model to produce a mixing model; and
determining the output sequence of frames based on the mixing model.

11. The method of claim 1, wherein the transforming further comprising:
representing a relationship between the input sequence and the output sequence according to $$y = Cx + \eta = CBs + \eta = As + \eta,$$

wherein y represents values of the signal in the input sequence of video frames, C is an encoded matrix, wherein the value in the encoded matrix depends on the encoding pattern, B is an inverse Fourier transformation matrix, s is a Fourier coefficient vector, x represents values of the signal in the output sequence of frames, A is a mixing matrix of the transformation, and n is noise.

12. The method of claim 11, further comprising:
determining a fundamental frequency of the signal;
determining the Fourier coefficient vector s; and
determining the output sequence of video frames according to x=Bs.

13. The method of claim 12, further comprising:
acquiring a set of possible values of fundamental frequencies;
determining the Fourier coefficient vector for each value of fundamental frequency in the set of possible values of fundamental frequencies;
determining, for each Fourier coefficient vector, an error as a function of the fundamental frequency to produce a set of errors; and
selecting the Fourier coefficient vector corresponding to a minimum error in the set of errors.

14. A system for increasing a temporal resolution of a substantially periodic signal, comprising:
means for acquiring a signal as an input sequence of video frames having a first temporal resolution, wherein the signal is a substantially periodic signal, wherein the frames in the input sequence of video frames are encoded according to an encoded pattern; and
means for transforming the input sequence of video frames into an output sequence of video frames having a second temporal resolution, such that the second temporal resolution is greater than the first temporal resolution, wherein the transforming is based on a sparsity of the signal in a Fourier domain.

15. The system of claim 14, further comprising:
means for encoding the signal according to the encoded pattern during signal integration time of a frame of the input sequence of video frames.

16. The system of claim 14, wherein the frames in the input sequence of video frames are encoded differently.

17. A system for increasing a temporal resolution of a substantially periodic signal, comprising:
a sensor configured to acquire a signal as an input sequence of video frames having a first temporal resolution, wherein the signal is a substantially periodic signal;
a shutter configured to encode the frames in the input sequence of video frames according to an encoded pattern; and
a transformation module configured to transform the input sequence of video frames into an output sequence of video frames having a second temporal resolution, such that the second temporal resolution is greater than the first temporal resolution, wherein the transforming is based on a sparsity of the signal in a Fourier domain.

18. The system of claim 17, further comprising:
a storage for storing the output sequence of video frames.

19. The system of claim 17, further comprising:
a display configure to display the output sequence of video frames.

* * * * *